US006913840B2

(12) United States Patent
Nishikawa et al.

(10) Patent No.: US 6,913,840 B2
(45) Date of Patent: Jul. 5, 2005

(54) MAGNESIUM ALLOY MOLDED PRODUCT AND METHOD FOR MANUFACTURING THE SAME

(75) Inventors: Yukio Nishikawa, Ikeda (JP); Akira Takara, Osaka (JP); Koji Matsunaga, Katano (JP)

(73) Assignee: Matsushita Electric Industrial Co., Ltd. (JP)

( * ) Notice: Subject to any disclaimer, the term of this patent is extended or adjusted under 35 U.S.C. 154(b) by 198 days.

(21) Appl. No.: 09/989,139

(22) Filed: Nov. 21, 2001

(65) Prior Publication Data

US 2002/0060062 A1 May 23, 2002

(30) Foreign Application Priority Data

Nov. 22, 2000 (JP) ....................................... 2000-355095
Jan. 30, 2001 (JP) ....................................... 2001-021767

(51) Int. Cl.[7] ......................... B32B 15/00; B32B 15/04; B32B 15/08

(52) U.S. Cl. ....................... 428/649; 428/626; 428/457; 428/458; 428/470; 428/687

(58) Field of Search ................................. 428/626, 649, 428/687, 457, 469, 470, 463, 458, 542.6, 542.2, 34.1

(56) References Cited

U.S. PATENT DOCUMENTS 3,887,449 A * 6/1975 Baer .......................... 204/148
3,998,779 A * 12/1976 Baer ...................... 260/37 EP
4,770,946 A * 9/1988 Yamauchi et al. .......... 428/626
4,976,830 A * 12/1990 Schmeling et al. ........ 204/58.4
5,156,919 A * 10/1992 Brar et al. .................. 428/463
5,756,222 A * 5/1998 Bercaw et al. .............. 428/649
6,007,925 A * 12/1999 Kakizaki et al. ............ 428/623
6,358,595 B1 * 3/2002 Kobayashi .................. 428/143
6,409,844 B1 * 6/2002 Shikata et al. .............. 148/261
6,569,264 B1 * 5/2003 Fukumura et al. .......... 148/259
2001/0020498 A1 * 9/2001 Seki et al. .................. 148/420
2002/0150774 A1 * 10/2002 Nishimura et al. ......... 428/457

FOREIGN PATENT DOCUMENTS

EP 0 892 074 * 1/1999
JP 2000160356 * 6/2000
WO WO00/407777 * 7/2000

* cited by examiner

*Primary Examiner*—Michael La Villa
(74) *Attorney, Agent, or Firm*—Parkhurst & Wendel, L.L.P.

(57) ABSTRACT

There is provided a magnesium alloy molded product being excellent in corrosion resistance. The magnesium alloy molded product being excellent in corrosion resistance and capable of being easily recycled is manufactured by forming an aluminum layer on a surface of a magnesium alloy molded body and then forming an anticorrosive film layer on the surface of the aluminum layer. In addition, a magnesium alloy molded product being excellent in corrosion resistance and having a brilliant anticorrosive structure is manufactured by forming a transparent anticorrosive film consisting of an organic acid amine salt on a cut surface of a magnesium alloy molded body and then forming a transparent painted film on the transparent anticorrosive film.

2 Claims, 9 Drawing Sheets

MAGNESIUM ALLOY MOLDED PRODUCT AND METHOD FOR MANUFACTURING THE SAME

FIELD OF THE INVENTION

The present invention relates to a magnesium alloy molded product used in casings and the like for household electric appliances and the like, and to a method for manufacturing such a magnesium alloy molded product.

BACKGROUND OF THE INVENTION

In recent years, from the point of view of environmental protection, there is a demand for materials that do not emit hazardous substances during utilization as well as disposal and incineration, and are easily decomposed in the soil after having been put to disposal. For such materials, application of molded products consisting of magnesium alloys, which are light and easily decomposed in the soil, has been studied to substitute plastic products heretofore widely utilized.

Heretofore, since these types of magnesium alloys generally have low corrosion resistance, and long-lasting corrosion resistance cannot be achieved even if normal painting is performed, the alloys are normally subjected to chemical treatment, such as chromic acid treatment, to ensure corrosion resistance, and then painted for coloring and weather resistance. As a method that does not rely on chemical treatment, a method for forming an aluminum layer on the surface of a magnesium alloy molded body, and coloring it by painting, is proposed in Japanese Patent Laid-Open No. 9-192261 (1997).

However, according to the above described conventional methods, since a product is provided with corrosion resistance and coloring by painting, or a product is colored by painting, the color depends on the type of paint, so that the paint must be changed depending on a color desired and paint components such as pigments need be varied for use. As a result, since impurities such as pigments disposed of in recycling vary, there was a problem that the removal of impurities becomes complicated.

In addition to the ease of recycling, magnesium alloys have attracted public attention as a casing for devices for their lightness and excellent heat dissipating characteristics. Products in which magnesium alloys are practically used include casings of portable household electrical appliances (note-type personal computers, portable cassette-tape players, portable MD players, etc.), and wheels of vehicles. Magnesium alloys include AZ 91 series for casting and AD 31 series for sheet metals, most of which are used for casting, and are processed by a die-casting method and a thixo˙molding method.

The surfaces of some potable household electrical appliances carry logotypes such as brand names. In many appliances, brilliant stickers or the like are bonded to these logotypes. However, brilliant surfaces are made by directly cutting casings to indicate logotypes in many small appliances that must be light, such as portable cassette-tape players and portable MD players. When aluminum-based materials are used as casings, brilliant surfaces can be made without special treatment to the cut surfaces because of the high corrosion resistance of the material. However, since aluminum-based materials are inferior to magnesium alloys in lightness and machinability, the use of magnesium alloys is preferable in casings. On the other hand, since the corrosion resistance of magnesium alloys is poorer when they are used in casings, the cut surfaces must be subjected to an anticorrosion treatment to make brilliant surfaces.

As the methods of anticorrosion treatment for brilliant surfaces, (1) an anodizing method, in which a transparent anodized film is formed and a transparent protective resin film is formed thereon, and (2) a vapor deposition method, in which an anticorrosive metal is vapor-deposited, and a transparent protective resin film is formed thereon, have been proposed and practically used.

However, anticorrosion treatments practically used as described above have the following problems:

(1) The anodizing method requires a complicated jig for electrically contacting desired locations of members to be treated, and a mechanism for checking the electrical contacting state in the anodizing treatment. Further there was a problem that brilliant surfaces formed by this anodizing method have lower brightness, and original brightness of the cut surface was absent.

(2) In the vapor deposition method, although masking can be used for the anticorrosion treatment of a large area, the treatment is very difficult for small and complicated cut surfaces representing brand names or the like.

Therefore, from the point of view of corrosion resistance of magnesium alloy molded products, an object of the present invention is to provide a magnesium alloy molded product that excels in corrosion resistance and is easy to recycle; a magnesium alloy molded product that excels in corrosion resistance, can be colored, and is easy to recycle; and a method for manufacturing such magnesium alloy molded products.

From the point of view of the corrosion resistance and the brilliant surfaces of magnesium alloy molded products, an object of the present invention is to solve the problems in conventional methods, and to provide a magnesium alloy molded product that has a brilliant anticorrosive structure having an anticorrosive protective film without lowering the brightness of the brilliant surface.

DISCLOSURE OF THE INVENTION

According to the present invention, in order to solve the above-described common problems, a nonmetal anticorrosive film layer that contains no magnesium element is formed on the surface of a magnesium alloy molded body, and a transparent painted film is formed thereon. This allows for a brilliant anticorrosive structure which realizes a beautiful surface state by forming the transparent painted film while ensuring corrosion resistance of the magnesium alloy molded body; a surface state having an interference color substituting painting; and a brilliant surface obtained by cutting a part of the surface in a desired shape at such a site as representing a logotype or the like so as to expose the skin of the magnesium alloy.

Specifically, in order to ensure high corrosion resistance substituting conventional painting, the magnesium alloy molded product according to the present invention comprises a magnesium alloy molded body, an aluminum layer formed on the surface of the magnesium alloy molded body, and an anticorrosive film layer formed on the aluminum layer. According to the above-described constitution, since the aluminum layer is formed on the surface of the magnesium alloy molded body, corrosion resistance is thereby enhanced, and since the anticorrosive film layer is formed on the aluminum layer, corrosion resistance is further enhanced by this anticorrosive film layer. Furthermore, since the corrosion resistance of the magnesium alloy molded body is provided by the aluminum layer and the anticorrosive film layer, and not by painting as in the conventional methods, no removal of impurities in the paint is required, and the products can be recycled easily.

Also according to the present invention, the anticorrosive film layer produces an interference color in the above-described constitution. According to this constitution, color is provided by the interference color of the anticorrosive film layer, so that unlike coloring by painting using colorants such as pigments, no removal of colorants such as pigments is required, and the products can be recycled easily.

In the above-described constitution, the thickness of the aluminum layer is 0.1 to 500 $\mu$m. According to this constitution, since the thickness of the aluminum layer is 0.1 to 500 $\mu$m, the thickness is adequate, and corrosion resistance is enhanced with the aluminum layer without loosing lightness, which is a feature of magnesium alloys.

In the above-described constitution, a transparent painted film is formed on the surface of a chemically formed film. According to this constitution, the anticorrosive film layer is protected by the transparent painted film, and weather resistance is also enhanced as well as corrosion resistance.

Furthermore, a first method for manufacturing a magnesium alloy molded product comprises the steps of molding a magnesium alloy; forming an aluminum layer on a surface of an obtained magnesium alloy molded body; and chemically treating the magnesium alloy molded body, on which the aluminum layer has been formed, to form an anticorrosive coating layer that produces an interference color on the surface of the aluminum layer. According to the above-described constitution, a colored magnesium alloy molded product with excellent corrosion resistance can be obtained without using any coloring materials.

In addition, the second method for manufacturing a magnesium alloy molded product comprises the steps of forming a joined sheet consisting of a magnesium alloy sheet and an aluminum sheet, processing the joined sheet into a desired shape, and chemically treating the molded joined sheet to form an anticorrosive coating layer that produces an interference color on the surface of the aluminum sheet. According to the above-described constitution, a colored magnesium alloy molded product with excellent corrosion resistance can be obtained without using any coloring materials, and furthermore, since a magnesium alloy sheet and an aluminum sheet can be previously formed, an magnesium alloy molded product having a predetermined thickness can be manufactured easily.

The method for manufacturing a magnesium alloy molded product according to the present invention further comprises a step for forming a transparent painted film on the surface of the anticorrosive coating layer after the step of forming the anticorrosive coating layer. According to this constitution, the transparent painted film protects the anticorrosive film layer, weather resistance is enhanced together with corrosion resistance and the visual recognition of the interference color of the anticorrosive film layer is not disturbed.

Next, a magnesium alloy molded product having a brilliant anticorrosive structure comprises a magnesium alloy molded body having a cut surface of a desired shape, a transparent anticorrosive film consisting of an organic acid amine salt formed at least on the cut surface, and a transparent painted film formed on the transparent anticorrosive film. The magnesium alloy molded product thus formed is immersed in an alkaline aqueous solution to form a water-repellent transparent anticorrosion film on the surface thereof, and afterwards a protective film is formed with a transparent painted film, so as to form an anticorrosive protective film that excels in corrosion resistance without lowering the brightness of the brilliant surface which is the cut surface of the magnesium alloy. According to the above-described constitution, since the magnesium alloy molded product is immersed in an alkaline aqueous solution to form a water-repellent protective film, and then to form a protective film with a transparent painted film, the magnesium alloy molded product has an anticorrosive protective film that excels in corrosion resistance without lowering the brightness of the brilliant surface which is the cut surface of the magnesium alloy.

A method for manufacturing a magnesium alloy molded product having a brilliant anticorrosive structure of the present invention comprises a step of forming at least a painted film on a magnesium alloy molded body; a step of forming a cut surface by cutting at least a part of the painted film; a step of exposing the magnesium alloy molded body to an aqueous solution of an organic amine salt after the cutting step; a step of forming a transparent anticorrosive film at least on the cut surface by water-rinsing and drying the magnesium alloy molded body exposed to the aqueous solution of the organic amine salt; and a step of forming a transparent painted film by applying and solidifying a solution of a transparent resin. The magnesium alloy molded product thus manufactured has the anticorrosive protective film that excels in corrosion resistance, without lowering the brightness of the brilliant surface which is the cut surface of the magnesium alloy.

An arrangement for manufacturing a magnesium alloy molded product, which is an arrangement for forming a transparent anticorrosive film in a magnesium alloy molded product having a brilliant anticorrosive structure, comprises a first unit for exposing a magnesium alloy molded body on which a cut surface has been formed to an aqueous solution of an organic acid amine salt; a second unit for removing an excessive aqueous solution of the organic acid amine salt from the magnesium alloy molded body by rinsing with water; a third unit for water swishing and drying the magnesium alloy molded body; and a conveyer unit for conveying the magnesium alloy molded body sequentially from the first unit through the second unit to the third unit. The above-described arrangement forms the anticorrosive protective film that excels in corrosion resistance, without lowering the brightness of the brilliant surface which is the cut surface of the magnesium alloy.

An arrangement for manufacturing a magnesium alloy molded product having a brilliant anticorrosive structure of the present invention, which is an arrangement for forming a transparent anticorrosive film for a magnesium alloy molded product having a brilliant anticorrosive structure, comprises a turntable that can receive thereon a magnesium alloy molded body having a cut surface formed thereon; an ejecting nozzle disposed perpendicularly above the turntable and adapted to eject an aqueous solution of an organic acid amine salt onto the magnesium alloy molded body; and a spray nozzle disposed perpendicularly above the turntable and adapted to spray water for rinsing onto the magnesium alloy molded body. The above-described arrangement forms the anticorrosive protective film that excels in corrosion resistance, without lowering the brightness of the brilliant surface which is the cut surface of the magnesium alloy.

According to the method and arrangement for manufacturing a magnesium alloy molded product having a brilliant anticorrosive structure of the present invention, since no electrical means is required, and the anticorrosive film can be formed by an immersion method, the magnesium alloy molded product can be manufactured using a simple manufacturing system. Also, according to the method and arrangement for manufacturing a magnesium alloy molded product having a brilliant anticorrosive structure of the present invention, the brilliant anticorrosive treatment can be applied to cut surfaces of any size and any shape without being affected by the size and shape of the cut surface, so that a casing of a portable household electrical appliance, such as a portable audio apparatus, can be manufactured easily.

A casing composed of a magnesium alloy molded body having a brilliant anticorrosive structure of the present invention comprises a magnesium alloy molded body having a cut surface of a desired shape; a transparent anticorrosive film consisting of an organic acid amine salt formed at least on the cut surface; and a transparent painted film formed on the transparent anticorrosive film. The casing composed of a magnesium alloy molded body having a brilliant anticorrosive structure thus manufactured includes the anticorrosive protective film that excels in corrosion resistance, without lowering the brightness of the brilliant surface which is the cut surface of the magnesium alloy.

According to the present invention, since a transparent anticorrosive film consisting of an organic acid amine salt is formed on the cut surface of the magnesium alloy, and a transparent painted film is formed thereon, the manufacturing process is simpler than a process for manufacturing an anticorrosive protective film using a conventional vapor-deposited film or anodized film, and the effect of manufacturing highly reliable anticorrosive protective films at low costs can be achieved.

DESCRIPTION OF PREFERRED EMBODIMENTS

In Embodiments 1 and 2, a magnesium alloy molded product and a method for manufacturing the same according to the present invention will be described referring to the attached drawings, and in Embodiments 3, 4, and 5 a magnesium alloy molded product having a brilliant anticorrosive structure according to the present invention will be described referring to the attached drawings.

Embodiment 1

Although a magnesium alloy molded product is formed by injection molding or die-casting, an example of forming by injection molding will be described here.

The process of injection molding comprises the melting step for melting a magnesium alloy, and the injection step for injecting the melt into a mold, and a conventional injection-molding machine is used for this process.

Figure 1:
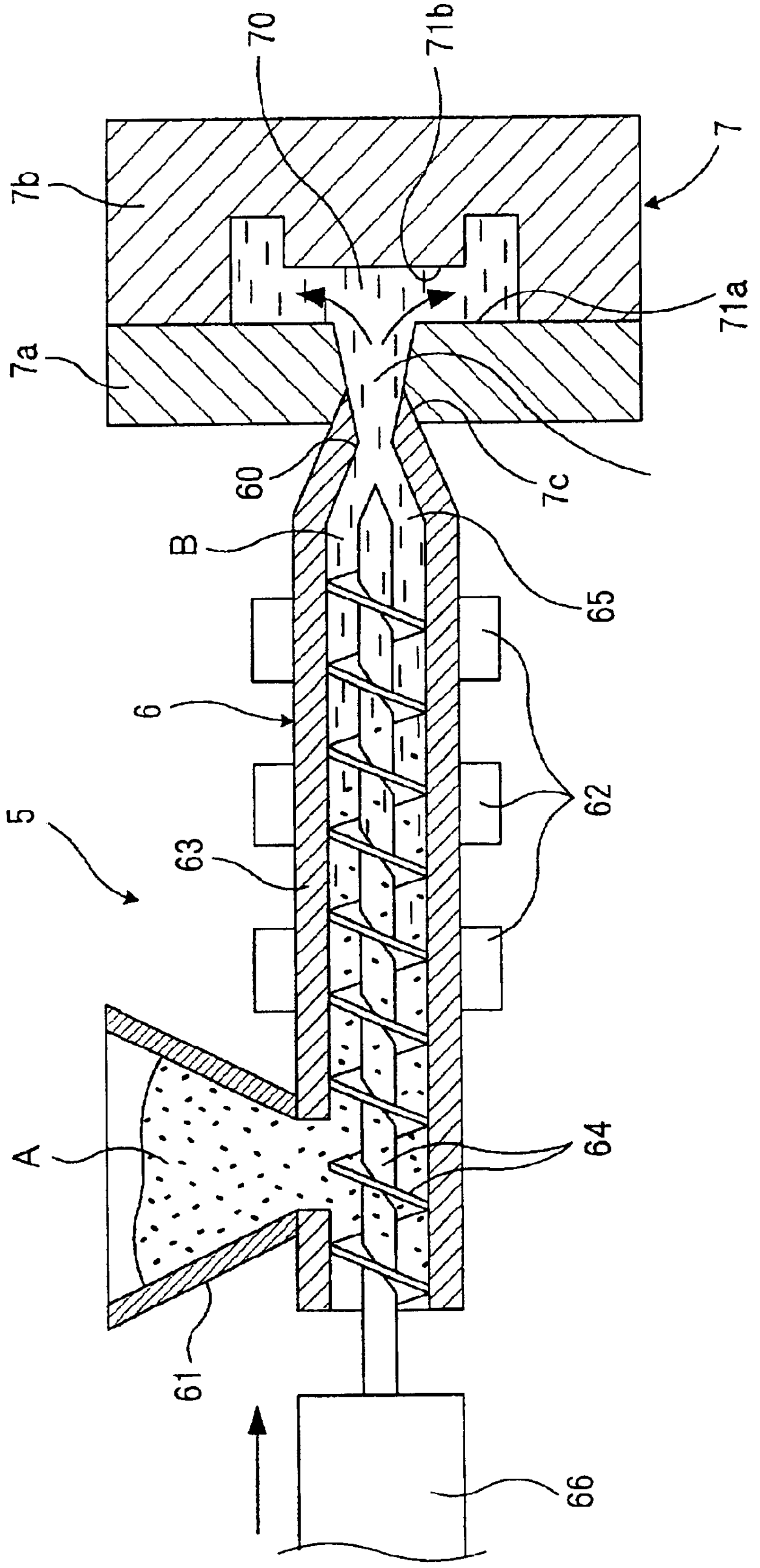
FIG. 1 is a sectional view schematically showing an injection-molding machine for injection molding of a magnesium alloy molded body according to the present invention.

The injection-molding machine 5 comprises, for example as shown in the schematic sectional view of FIG. 1, an injection unit 6 for melting and mixing the magnesium alloy (for example, an alloy consisting of magnesium and aluminum) A, which is a starting material, into a melt; and a split mold 7 contacting a nozzle 60 of the injection unit 6 and having a cavity 70 of a desired shape formed on its internal surface so that a molded product can be taken out. This split mold 7 is composed of a stationary half 7*a* and a movable half 7*b*.

In injection molding using the above-described injection molding machine 5, the movable half 7*b* is set to the stationary half 7*a*, and the tip of the nozzle 60 of the injection unit 6 is pushed against and connected to an inlet 7*c* of the stationary half 7*a*. In this state, the magnesium alloy A is fed from a hopper 61 into a cylinder 63 heated by heaters 62, and melted and mixed by a screw 64 in the cylinder 63 to a melt B. The screw 64 is then retracted while rotating to transfer the melt B being kept heated to the front of the cylinder 63 and form a melt pool 65, and then the screw 64 is pushed by the pressurizing means 66 to inject the melt B at a high speed into the cavity 70 of the split mold 7. The melt B injected into the cavity 70 contacts the internal surfaces 71*a* and 71*b* sequentially and cooled, and solidification proceeds in a flowing state. In this time, until the melt B injected into the cavity 70 solidifies completely, the screw 64 is pushed by the pressurizing means 66 to pressurize the melt B, and the melt B is pushed against the internal surfaces 71*a* and 71*b* of the cavity 70 while supplementing solidified and shrunk melt. After the melt B is completely solidified, the mold 7 is split and the molded product is taken out and cooled in air.

Figure 2:
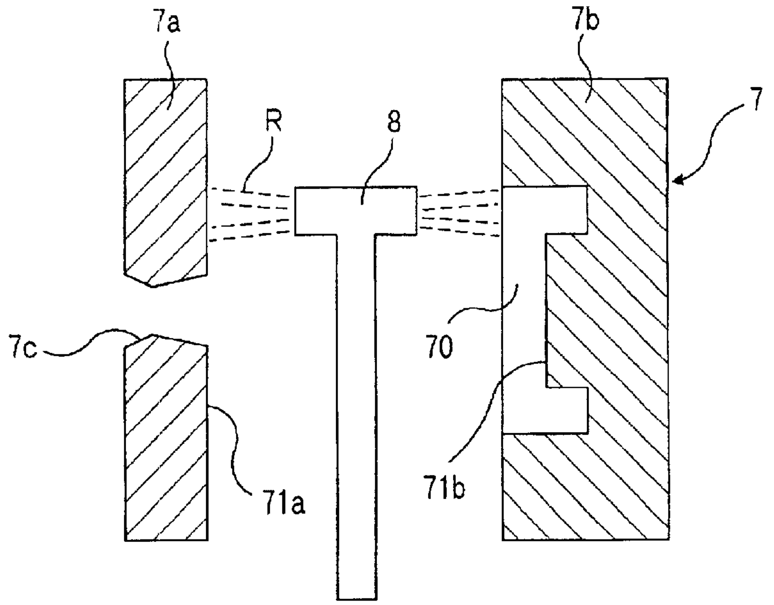
FIG. 2 is a sectional view of a mold showing a state of applying release agent in the injection-molding machine shown in FIG. 1.

As FIG. 2 shows, a release agent R is previously applied as required to the internal surfaces 71*a* and 71*b* of the cavity 70 of the above-described mold 7. Used as the release agent R is, for example, a waxy mixture of fatty acid esters.

Normally, a liquid release agent R is sprayed onto the internal surfaces 71*a* and 71*b* of the cavity 70 of the opened mold 7 using a spray nozzle 8, and dried to form a release agent film. The application of the release agent R prevents the molded product from sticking to the mold 7, and facilitates the separation of the molded product from the mold 7. In the case of die-casting, the release agent is applied to the die as required.

When the release agent is used, it is preferable to remove the release agent from the surface of the molded product by etching, blasting, or surface polishing to clean the surface of the molded product.

Next, an aluminum layer is formed on the surface of an injection-molded product. Since magnesium and its alloy is an electrochemically base (imperfect) material, aluminum of a low potential is unlikely to undergo electrolytic corrosion, and is an optimal material with high corrosion resistance.

In order to form an aluminum layer on the surface of a molded product, a thin-film forming method, such as sputtering and vapor deposition, is used.

Figure 3:
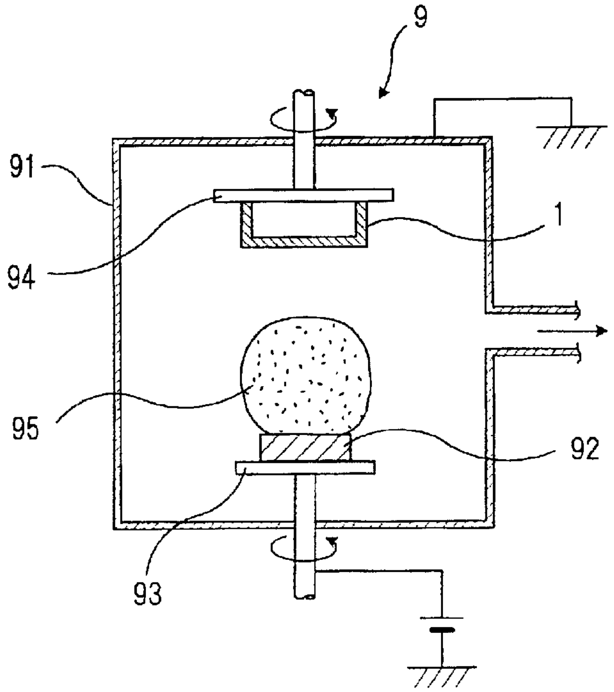
FIG. 3 is a sectional view showing a sputtering apparatus for forming an aluminum layer according to the present invention.

In order to form an aluminum layer by sputtering, a sputtering apparatus such as shown in FIG. 3 is used. This sputtering apparatus 9 comprises a support 93 for rotatably supporting a target 92 in a vacuum chamber 91, and a support 94 for rotatably supporting the molded product 1 on which an aluminum layer is to be formed.

In the above-described sputtering apparatus 9, plasma 95 generated from the target 92 supported and rotated by the support 93 is radiated onto the surface of the molded product 1 held by the support 94 to form a thin aluminum layer of a thickness of 0.1 to several $\mu$m by aluminum atoms and particles contained in the plasma 95. In order to improve adhesion force between the molded product 1 and the aluminum layer at this time, it is preferable to adopt conditions to increase the particle speed of the plasma 95, and to select optimal temperature conditions of the molded product 1.

When the molded product 1 is held on the rotatable support 94 as described above, atoms and particles contained in the plasma 95 generated from the target 92 can reach the entire surface of the molded product 1 having complicated three-dimensional geometry, and the aluminum layer 2 can be formed on the entire surface. The aluminum layer may be formed on the base side of the molded product as required.

Next, an anticorrosive film layer is formed on the surface of the aluminum layer.

The anticorrosive film layer includes, for example, a layer of an oxide such as alumina formed by the reaction of aluminum to form the above-described aluminum layer and an acid or the like, and an alumite layer formed by the reaction of aluminum and iron. These layers have micropores. In order to form a chemically treated film layer having sufficient corrosion resistance, thickness thereof is preferably 0.1 $\mu$m or more. Although there is no upper limit of thickness thereof, the upper limit is preferably about 30 $\mu$m when the productivity is considered. As the matter of course, this chemically treated film layer does not contain magnesium element.

In order to form a chemically treated film layer that generates an interference color, a transparent film such as an alumina film is formed, and the thickness thereof is adjusted so as to be ¼ the wavelength of visible light beams or thicker. By variously changing the thickness of the chemically treated film layer, desired colors can be obtained.

This interference color is recognized as a color by the interference between light beams reflected on the surface of the above-described aluminum layer, and light beams reflected on the surface of the chemically treated film layer.

Figure 4:
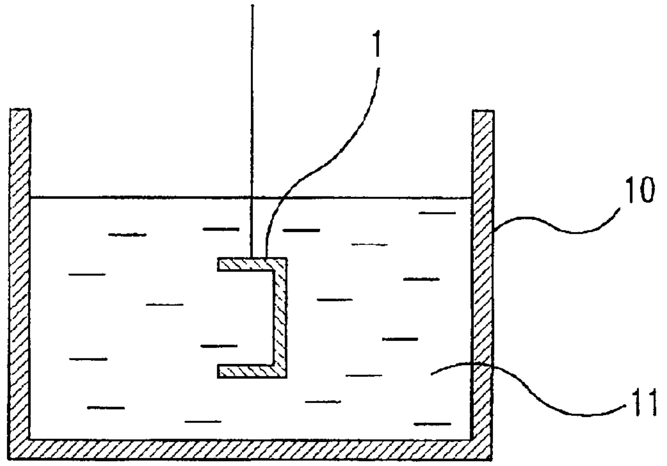
FIG. 4 is a sectional view showing a chemical-treatment tank for forming an anticorrosive film layer according to the present invention.

The above-described chemically treated film layer is formed, for example, by immersing the molded product 1 on which the above-described aluminum layer is formed in a treating solution 11 such as an acid in a chemical treatment tank 10 as FIG. 4 shows. In the case of anodizing treatment, electric current is supplied to be processed.

Although the molded product on which a chemically treated film layer is formed may be used as it is, it is preferable to form a transparent painted film on the surface in order to further improve corrosion resistance, weather resistance, and the like.

Figure 5:
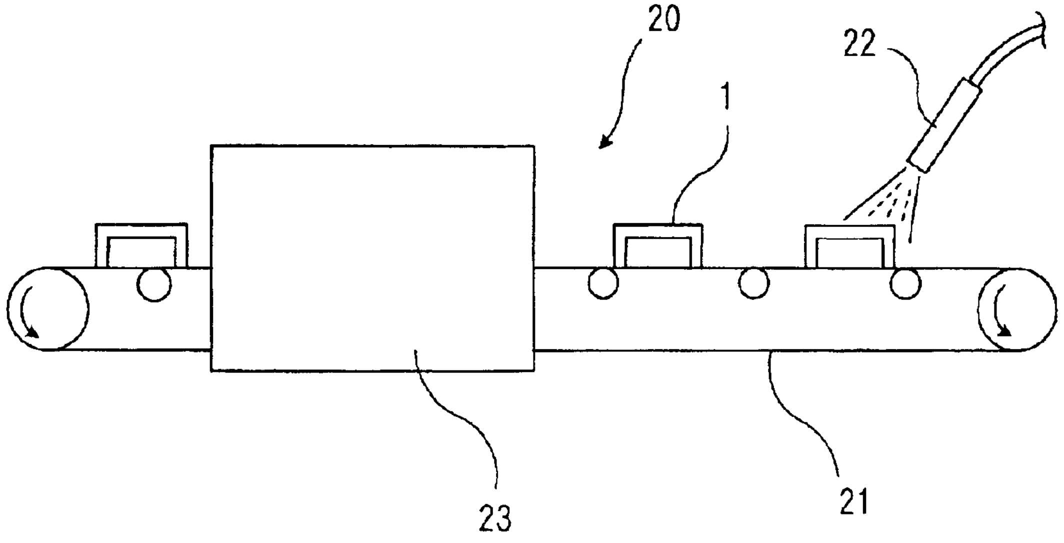
FIG. 5 is a schematic diagram showing a painting apparatus for forming a transparent painted film according to the present invention.

In order to form the transparent painted film, a painting apparatus such as shown in FIG. 5 is used. In this painting apparatus 20, molded products 1 arranged on a conveying device 21 such as a belt conveyor are transferred by the conveying device 21, a transparent paint is applied on the surface thereof with a spray 22, and is baked in a dryer 23.

Figure 6:
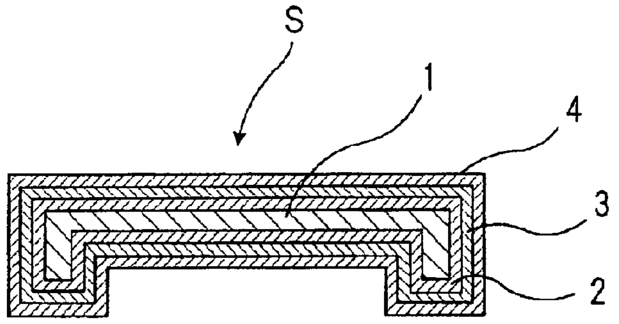
FIG. 6 is a sectional view showing an example of magnesium alloy molded products according to the present invention.

A molded product S thus obtained has an aluminum layer 2, an anticorrosive layer 3, and a transparent painted film 4 formed on the surface of a molded product 1, in this order, as shown in FIG. 6.

By such constitution, there is provided a molded product having corrosion resistance, and further having a color, without loosing the lightness of the magnesium alloy.

Embodiment 2

The difference of Embodiment 2 from Embodiment 1 is the use of a joined sheet, prepared by joining a previously formed magnesium alloy sheet in place of the magnesium alloy molded body, and an aluminum sheet as the aluminum layer.

Figure 7:
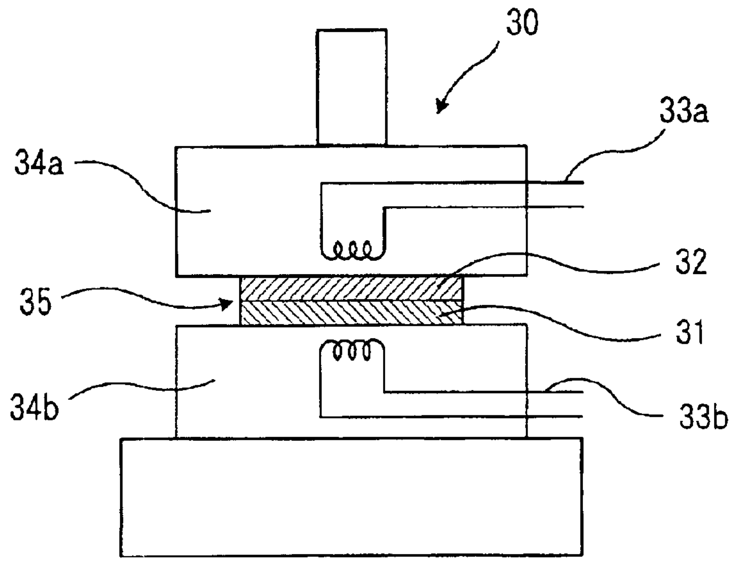
FIG. 7 is a schematic constitution diagram showing a press for fabricating a joined sheet according to the present invention.

In order to prepare the joined sheet from a magnesium alloy sheet and an aluminum sheet, a press such as shown in FIG. 7 is used.

The press 30 shown in FIG. 7 has a press plate 34*a* including a heater 33*a*, and a press plate 34*b* including a heater 33*b*, respectively disposed up and down. In this press 30, a magnesium alloy sheet 31 and an aluminum sheet 32 each having a cleaned surface are laminated, heated to a predetermined temperature between 200° C. and a temperature of the melting point of the magnesium alloy or lower by the heaters 33*a* and 33*b*, and pressed by the press plates 34*a* and 34*b* to form the joined sheet 35.

Since magnesium (or alloys thereof) can form a solid solution with aluminum, when both materials are pressed under heat, they are firmly joined by a mechanism of a diffusion-bonding type. As the laminate structure of the joined sheet 35 may be such that one magnesium alloy sheet 31 and one aluminum sheet 32 are laminated as described above, the laminate structure having higher corrosion resistance can be obtained from a three-layer structure in which aluminum sheets 32 are laminated on both sides of a magnesium alloy sheet 31.

Figure 8:
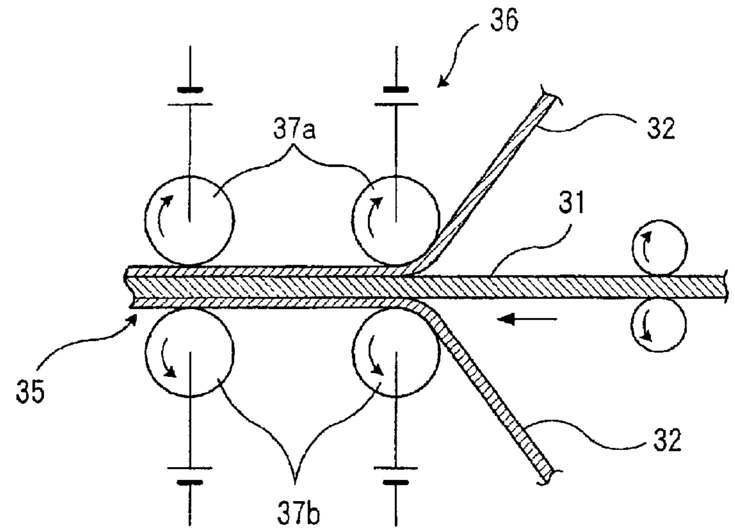
FIG. 8 is a schematic constitution diagram showing a roll for fabricating the joined sheet according to the present invention.

FIG. 8 shows a roll comprising rollers for continuously forming the above-described joined sheet of a three-layer structure.

In this roll 36, a magnesium alloy sheet 31 and aluminum sheets 32, 32 sandwiching the magnesium alloy sheet 31 are simultaneously fed between a plurality of rollers 37*a* and 37*b*, and a joined sheet is continuously formed by heat and pressure from these rollers 37*a* and 37*b*.

Figure 9:
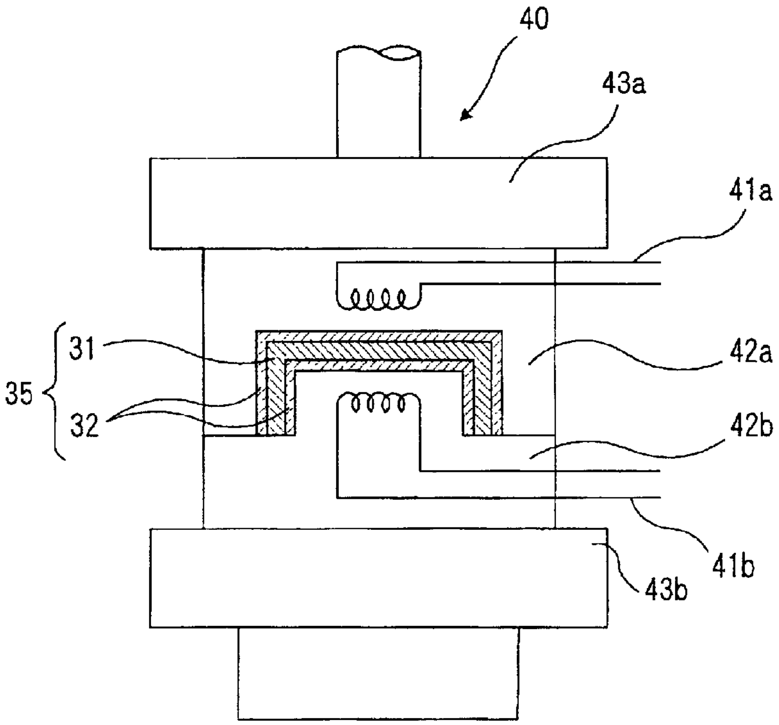
FIG. 9 is a schematic constitution diagram showing a molding press for fabricating the joined sheet according to the present invention.

Next, the joined sheet obtained as described above is pressed into a predetermined shape. In order to press the joined sheet, a press molding apparatus such as shown in FIG. 9 is used.

The press molding apparatus 40 has an upper die 43*a* including a press die 42*a* having a heater 41*a*, and an under die 43_b_ including a press die 42_b_ having a heater 41_b_, respectively disposed up and down. In this press 10, when the above-described joined sheet 35 of a three-layer structure is hot-pressed between the press die 42_a_ and the press die 42_b_, for example, a pressed body of a predetermined shape is formed.

According to this press 40, since the outer layer aluminum sheets 32, 32 have a larger malleability compared with the magnesium alloy sheet 31, a favorable joined sheet 35 can be obtained by adjusting molding conditions to be suitable for the magnesium alloy. Although the shape of joined sheet 35 thus formed by the above-described press 40 is flat, it can be made three-dimensional by forging.

The pressed body consisting of a magnesium alloy sheet and an aluminum sheet obtained as described above is processed in the following steps in the same manner as in Embodiment 1, and a chemically treated film layer and a transparent painted film are formed on the surface thereof.

According to above-described Embodiment 2 as described above, since a previously pressed aluminum sheet can be used, a thicker aluminum layer than the one in Embodiment 1 can be obtained. For example, an aluminum layer as thick as about 0.5 mm can be formed easily.

Also, Embodiment 2 has an advantage that the joined sheet can be fabricated previously as a standard component, which cannot be achieved in Embodiment 1.

Embodiment 3

Figure 10:
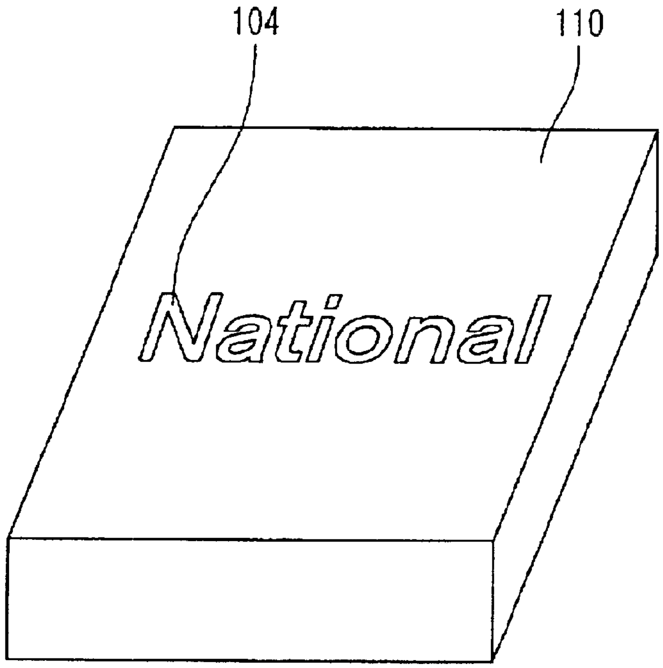
FIG. 10 is a perspective view showing a casing, which is an example of magnesium alloy molded products having a brilliant anticorrosive structure according to the present invention.
Figure 11:
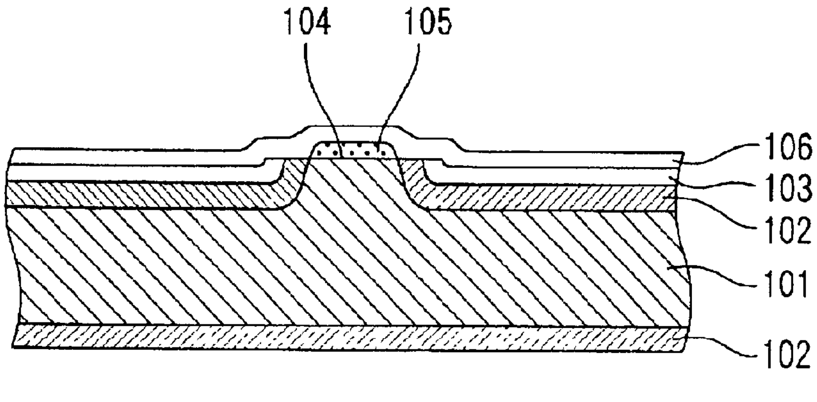
FIG. 11 is a sectional view showing a cross-sectional structure of the magnesium alloy molded product having a brilliant anticorrosive structure according to the present invention.

As FIG. 10 shows, the casing according to Embodiment 3 is a magnesium alloy molded product which is, for example, a cover of a portable audio device such as a portable MD player. The surface of this casing carries a logotype having a brilliant surface. This brilliant surface is processed by a brilliant anticorrosion treatment. FIG. 11 shows an enlarged cross-sectional structure of the surface provided with a brilliant anticorrosion treatment of the casing shown in FIG. 10.

As FIG. 11 shows, on the surface of a magnesium alloy molded body 101 is formed an anticorrosive film 102 as a primer anticorrosion treatment, and on this anticorrosive film 102 is formed a painted film 103. On a part of the surface of the magnesium alloy molded body 101 processed with the primer anticorrosion treatment as described above, the uppermost part of the area that has been initially formed to be convex for forming the logotype is cut, and a cut surface 104 where the skin of the magnesium alloy is exposed is formed.

On the cut surface 104 thus formed on the magnesium alloy molded body 101, a transparent anticorrosive film 105 and a transparent painted film 106 are formed, and subjected to a brilliant anticorrosion treatment. The transparent anticorrosive film 105 is formed by an immersion method described below, and since it is made of an amine, it adheres only to the metallic surface, but does not adhere to the organic painted film 103. The transparent painted film 106 is formed of a resin-based paint. Therefore, the anticorrosive film 105 is formed only on the cut surface 104, and the transparent painted film 106 is formed on the entire surface of the magnesium alloy molded body 101, including the cut surface 104.

Next, a method for forming a brilliant anticorrosive surface on the magnesium alloy molded product according to Embodiment 3 constituted as described above will be described.

First, a method for manufacturing the magnesium alloy molded body before the brilliant anticorrosive surface is formed will be described specifically.

The magnesium alloy molded body 101 according to Embodiment 3 is a cover for a portable MD player, and was molded from AZ91D magnesium alloy using a thixo˙molding machine produced by The Japan Steel Works, Ltd. Thereafter, as primer treatment, the magnesium alloy molded body 101 was subjected to the processes of degreasing treatment, surface treatment, and chemical pretreatment, and a magnesium phosphate coating was formed as the anticorrosive film 102.

In the above-described primer anticorrosion treatment in Embodiment 3, the degreasing treatment was specifically carried out by immersing the magnesium alloy molded body 101 in an aqueous solution of sodium phosphate of a temperature between 60° C. and 70° C. for 3 minutes. For the surface treatment, the magnesium alloy molded body 101 was immersed in an aqueous solution of sodium hydroxide of a temperature between 70° C. and 90° C. for 10 minutes. Furthermore, the chemical pretreatment was carried out by immersing the magnesium alloy molded body 101 in an aqueous solution of calcium phosphate of a temperature between 55° C. and 65° C. for 3 minutes.

After the above-described primer anticorrosion treatment, a painted film 103 was formed on the magnesium alloy molded body 101. The painted film 103 was formed by applying and drying an epoxy-based primer, and an acrylic metallic paint was applied as the top coating. On the magnesium alloy molded body 101 after the above-described painting, the anticorrosive film 102 and the painted film 103 were cut to form the cut surface 104 using a lathe for displaying a desired logotype. Thus in order to form a cut surface 104 on the magnesium alloy molded body, the magnesium alloy molded body is cut with a lathe, and the skin of the magnesium alloy is exposed. The magnesium alloy molded body on which the cut surface 104 is formed is briefly called the molded body 101A in the following description.

Figure 12:
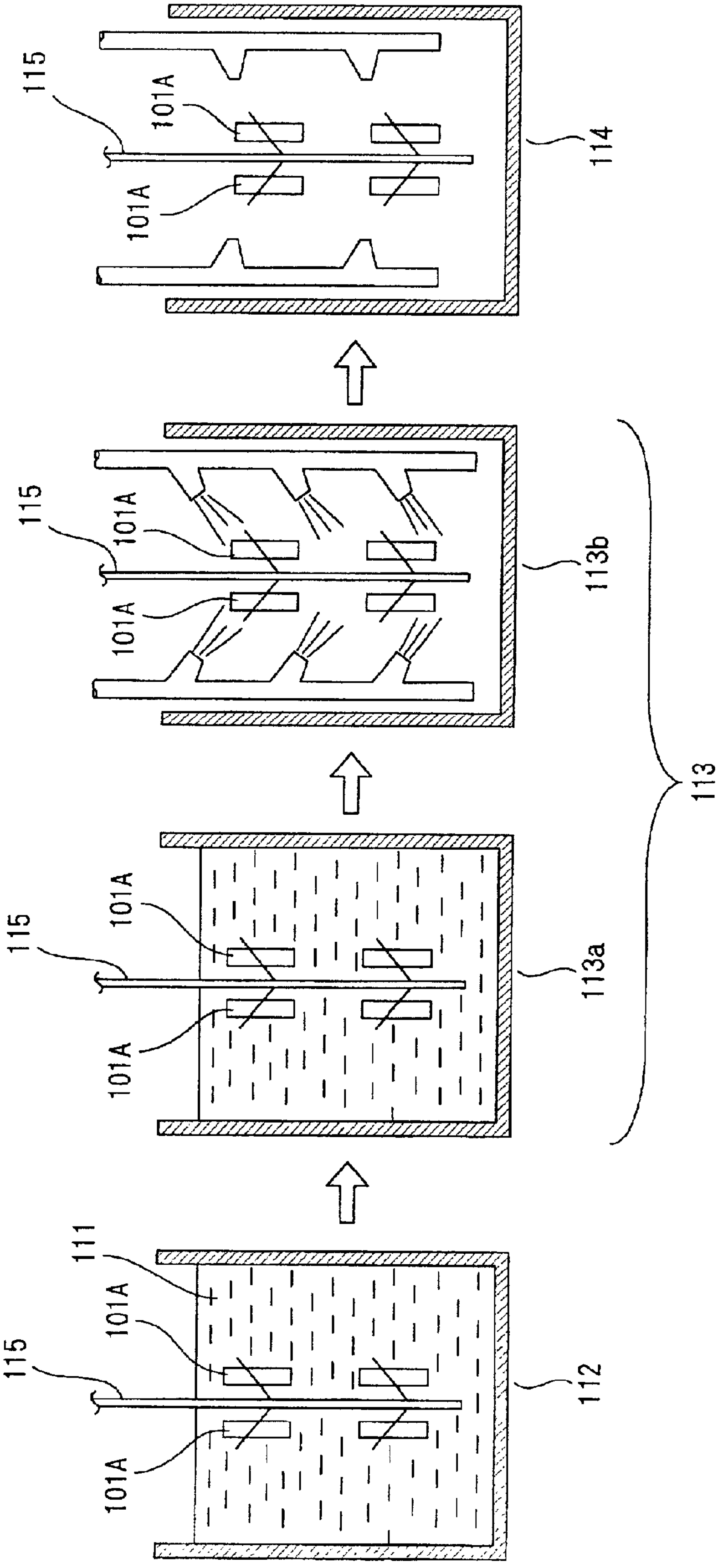
FIG. 12 is a diagram illustrating each manufacturing process in an arrangement for manufacturing the magnesium alloy molded product having a brilliant anticorrosive structure according to Embodiment 3 of the present invention.

Next, the method for forming a brilliant anticorrosive surface on the molded body 101A formed as described above will be described. FIG. 12 is a process diagram illustrating each process for forming a brilliant anticorrosive surface on the molded body 101A.

In the first process 112, the molded body 101A on which the cut surface 104 is formed as described above is immersed in a tank filled with an aqueous solution of an organic acid amine salt 111 to expose the entire surface to the solution 111. In the first process 112, the molded body 101A is immersed in a tank filled with an aqueous solution of an organic acid amine salt 111 at a normal temperature for about 30 seconds to adsorb an amine-based component on the cut surface 104.

Next, in the second process 113, the excessive aqueous solution of an organic acid amine salt 111, not adsorbed on the molded body 101A other than the cut surface 104, is removed by rinsing with water.

The rinsing with water in the second process 113 is divided into two steps: the first step 113_a_ of preliminary cleaning, and the second step 113_b_ of finish cleaning. In the first step 113_a_, the molded body 101A treated in the first process 112 is immersed in a tank filled with deionized water for preliminary cleaning. Next, in the second step 113_b_, the molded body 101A is placed in a shower-cleaning tank where cleaning water is ejected for finish cleaning.

The molded body 101A after the completion of the above-described water rinsing process is drained and dried in the third process 114. In the third process 114, air is blown to the molded body 101A, after the completion of the water rinsing in the third process 114, from an air shower 116 to drain off water and dry the molded body 101A.

After the above-described processes, since a water-repellent transparent anticorrosive film 105 is formed on the cut surface 104 of the magnesium alloy molded body 101A, the cut surface 104 becomes a brilliant surface, and the desired logotype or the like is displayed brilliantly. In Embodiment 3, the thickness of the transparent anticorrosive film 105 was several ten nanometers.

In Embodiment 3, a plurality of molded bodies 101A are hung from a holder 115 so that a plurality of molded bodies 101A are simultaneously treated. And the holder 115 is so constructed as to be transferred sequentially to each process with a conveying means such as a belt conveyor.

Furthermore, a transparent painted film 106 is formed as the final anticorrosive film on the molded body 101A on which the water-repellent transparent anticorrosive film 105 is formed as described above. As the material for the transparent painted film 106, an epoxy-based resin was used. For the transparent painted film 106, paints composed mainly of a thermosetting organic resin or ultraviolet curing organic resin may also be used. As the transparent painted film 106, a transparent film of a thickness of about 10 $\mu$m was formed by spray painting followed by baking at 160° C. for 20 minutes.

For the cover of a portable MD player formed as described above, the inventors conducted reliability tests such as a saline spraying test and a high-temperature and high-humidity test, and obtained favorable results from all the tests.

As described above, the magnesium alloy molded product formed using manufacturing arrangement of Embodiment 3 has an anticorrosive protective film that excels in corrosion resistance without lowering the brightness of the brilliant surface, which is the cut surface of the magnesium alloy, by immersing in an alkaline aqueous solution to form a water-repellent transparent anticorrosive film on the surface, followed by forming a protective film with a transparent painted film.

Embodiment 4

Nest, Embodiment 4, which is a method and arrangement for manufacturing a magnesium alloy molded product having a brilliant anticorrosive structure according to the present invention, will be described referring to FIG. 13. In Embodiment 4, the constituting parts having the same constitutions and functions as those in Embodiment 3 will be denoted by the same symbols and numerals, and the description thereof will be omitted.

Figure 13:
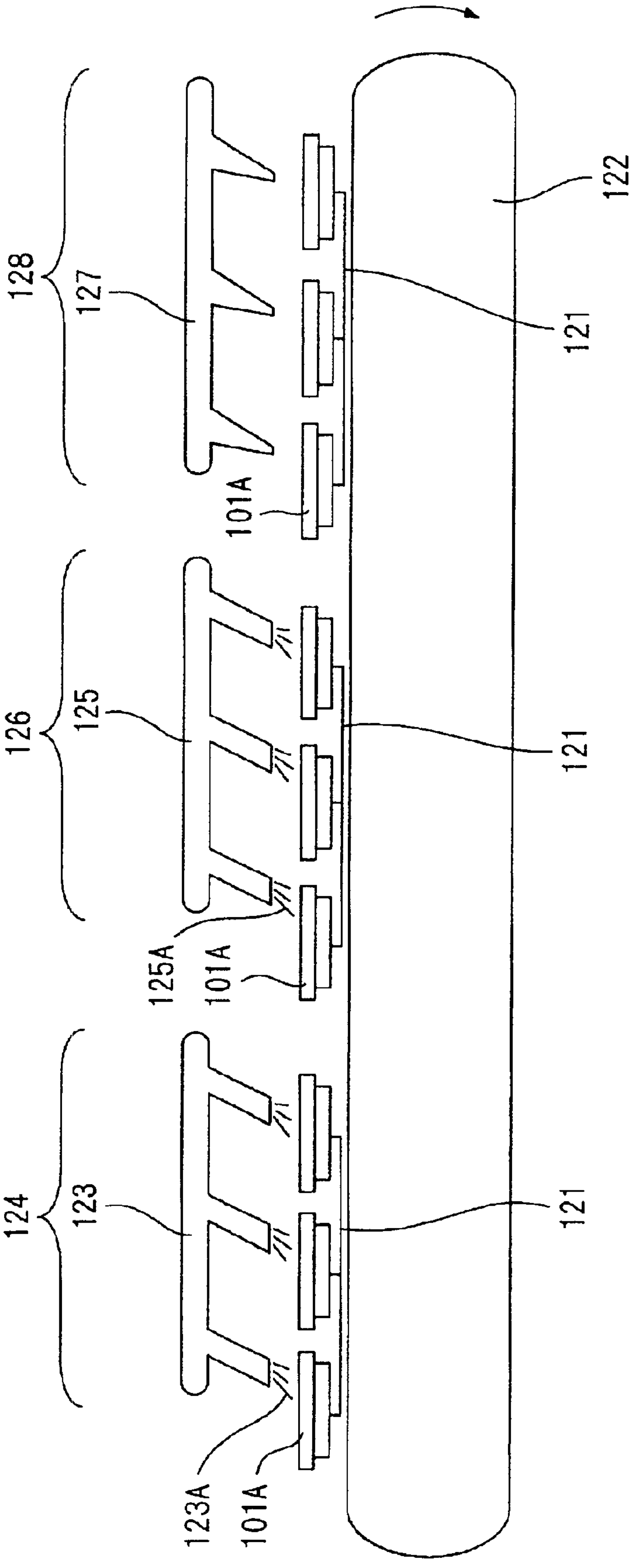
FIG. 13 is a perspective view showing each manufacturing step in the arrangement for manufacturing the magnesium alloy molded product having a brilliant anticorrosive structure according to Embodiment 4 of the present invention.

FIG. 13 is a schematic diagram showing the constitution of the manufacturing arrangement according to Embodiment 4 for forming a brilliant anticorrosive surface on the magnesium alloy molded product, and shows each process for forming the brilliant anticorrosive surface.

A magnesium alloy molded body 101A having a cut surface 104 is fabricated in the same manner as in the above-described manufacturing method according to Embodiment 3. As described in Embodiment 3, an anticorrosive film 102 is formed on the surface of the magnesium alloy molded product 101, and a painted film 103 is formed on the anticorrosive film 102. A part of the surface of the magnesium alloy molded product 101 that has been subjected to primer anticorrosion treatment is cut to display a logotype having a desired shape, and a cut surface 104 where the skin of the magnesium alloy is exposed is formed.

On the cut surface 104 of the surface of the magnesium alloy molded product 101 thus formed, a transparent anticorrosive film 105 and a transparent painted film 106 are formed as in above-described Embodiment 3, and are subjected to brilliant anticorrosion treatment. This transparent anticorrosive film 105 is formed by a flow-down method as described below, and the transparent painted film 106 is formed by painting. Therefore, the transparent anticorrosive film 105 is formed only on the cut surface 104, and the transparent painted film 106 is formed on the entire surface of the magnesium alloy molded product 101 including the cut surface 104.

Next, the flow-down method used for forming a transparent anticorrosive film 105 in Embodiment 4 will be described below. FIG. 13 is a schematic constitution diagram showing each process in the manufacturing arrangement used for forming a transparent anticorrosive film 105. As FIG. 13 shows, in the manufacturing arrangement for the magnesium alloy molded product according to Embodiment 4, the magnesium alloy molded body (molded body) 101A on which a cut surface 104 has been formed is transferred by a conveyor 122 as the conveying means to each process in the flow-down method. A plurality of molded bodies 101A on which cut surfaces 104 have been formed are practically horizontally held by a plurality of holders 121 formed to be one unit.

First, a plurality of molded bodies 101A held by a plurality of holders 121 are transferred to a first region 124 by the conveyor 122. In the first region 124, an aqueous solution of an organic acid amine salt 123A flows down from a plurality of nozzles attached to a pipe 123 fixed on the predetermined location. Each molded body 101A is exposed to the aqueous solution of the organic acid amine salt 123A in the first region 124 for a predetermined period of time.

Next, the molded bodies 101A that have passed through the first region 124 are transferred by the conveyor 122 to the second region 126 for a cleaning process. In the second region 126, deionized water 125A flows down flows down from a plurality of nozzles attached to a pipe 125 fixed on the predetermined location. Each molded body 101A is washed by the deionized water 125A for a predetermined period of time. Thus in the second region 126, the excessive aqueous solution of the organic acid amine salt 123A is removed by washing during the time when the molded bodies 101A pass through the second region 126.

Finally, a plurality of molded bodies 101A held by a plurality of holders 121 are transferred to a third region 128 for a drying process. In the third region 128, an air knife 127 is installed, which blows compressed air against the molded bodies 101A to remove water from the molded bodies 101A.

In Embodiment 4, as FIG. 13 shows, a plurality of molded bodies 101A held by a plurality of holders 121 are sequentially passed through the first region 124, the second region 126, and the third region 128 by the conveyor 122, so that the anticorrosive films 105 are formed on desired locations of the molded bodies 101A. In Embodiment 2, only the constitution in which the molded bodies 101A pass through the first region 124, the second region 126, and the third region 128 has been described, however, in the arrangement for manufacturing a magnesium alloy molded product according to the present invention, the molded bodies 101A are transferred to the first region 124 by a well-known conveying means in the state of being held by the holders 121, and after having been passed though the third region 128, the molded bodies 101A are transferred to the next painting process by another conveying means to form the transparent painted film 106.

As described above, the magnesium alloy molded product formed by the manufacturing arrangement of Embodiment 4 has an anticorrosive protective film that excels in corrosion resistance without lowering the brightness of the brilliant surface which is the cut surface of the magnesium alloy, by employing the flow-down process of an alkaline aqueous solution to form a water-repellent transparent anticorrosive film on the surface, followed by forming a protective film with a transparent painted film.

Embodiment 5

Next, Embodiment 5 directed to a method and arrangement for manufacturing a magnesium alloy molded product having a brilliant anticorrosive structure according to the present invention, will be described referring to FIG. 14. In Embodiment 5, the constituting parts having the same constitutions and functions as those in Embodiment 3 and Embodiment 4 will be denoted by the same symbols and numerals, and the description thereof will be omitted.

Figure 14:
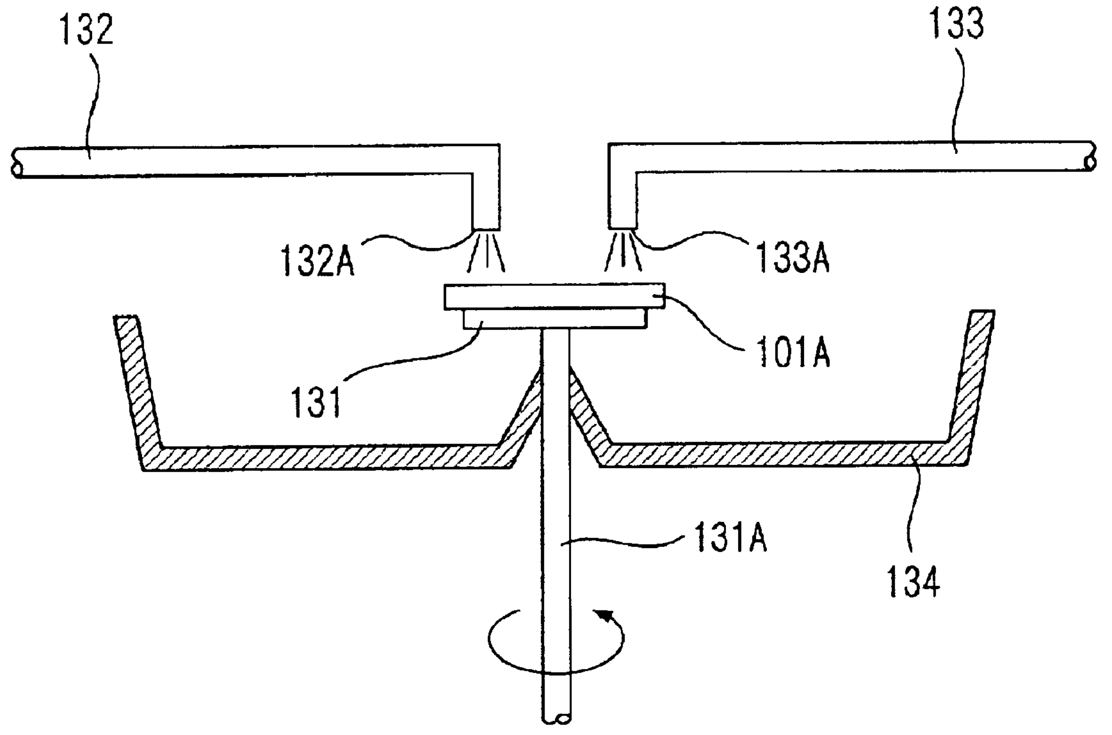
FIG. 14 is a diagram illustrating a manufacturing method using the arrangement for manufacturing the magnesium alloy molded product having a brilliant anticorrosive structure according to Embodiment 5 of the present invention.

FIG. 14 is a schematic diagram showing the constitution of the manufacturing arrangement according to Embodiment 5 for forming a brilliant anticorrosive surface on the magnesium alloy molded product.

The manufacturing arrangement according to Embodiment 5 is so constituted that the magnesium alloy molded body (molded body) 101A on which a cut surface 104 has been formed is placed on a turntable 131 rotating around a shaft 131A at a predetermined speed. Below the turntable 131, there is formed a circular pan 134 having a diameter considerably larger than the diameter of the turntable 131, and above the turntable 131, there are disposed an opening 132A from which an aqueous solution of an organic acid amine salt 132 is discharged, and a nozzle 133A from which deionized water 133 is ejected.

In the manufacturing arrangement constituted as described above, the molded body 101A is first placed on the turntable 131. In this state, the aqueous solution of the organic acid amine salt 132 is dropped from the opening 132A so as to be applied over the entire mold body 101A. After the wet molded body 101A on the turntable 131 is allowed to stand for about 20 seconds, the turntable 131 is rotated at a speed of 300 rpm to blow off the solution 132 from the molded body 101A.

Next, deionized water 133 is ejected from the nozzle 133A onto the molded body 101A to remove the excessive solution of the organic acid amine salt 132. Thereafter, the turntable 131 is rotated at about 1500 rpm for about 10 seconds. The deionized water is blown off from the molded body 101A by centrifugal force produced by rotation.

In the arrangement for manufacturing a magnesium alloy molded product according to Embodiment 5, as described above, the brilliant anticorrosion treatment can simply be performed both efficiently and quickly by using the turntable 131, and an excellent manufacturing arrangement capable of high speed processing can be realized.

As described above, the magnesium alloy molded product formed by the manufacturing arrangement of Embodiment 5 has an anticorrosive protective film that excels in corrosion resistance without lowering the brightness of the brilliant surface which is the cut surface of the magnesium alloy, by employing the dropping process of the alkaline aqueous solution to form a water-repellent transparent anticorrosive film on the surface, followed by forming a protective film with a transparent painted film.

What is claimed is:

1. A magnesium alloy molded product having a brilliant anticorrosive structure, comprising a magnesium alloy molded body having a portion where a skin of the magnesium alloy is exposed, a transparent anticorrosive film consisting of an organic acid amine salt and formed at least on said portion, and a transparent painted film composed mainly of a thermosetting organic resin formed on said transparent anticorrosive film.

2. A magnesium alloy molded product having a brilliant anticorrosive structure, comprising a magnesium alloy molded body having a portion where a skin of the magnesium alloy is exposed, a transparent anticorrosive film consisting of an organic acid amine salt and formed at least on said portion, and a transparent painted film composed mainly of an ultraviolet-curing organic resin formed on said transparent anticorrosive film.

* * * * *